(12) United States Patent
Ellsworth, Jr. et al.

(10) Patent No.: US 9,589,477 B2
(45) Date of Patent: Mar. 7, 2017

(54) METHOD OF KEYBOARD TRAINING USING KEYSTROKE TIME-OUT PERIOD

(75) Inventors: Dean Ellsworth, Jr., Chandler, AZ (US); Barbara Ellsworth, Chandler, AZ (US)

(73) Assignee: Ellsworth Publishing Company, Inc., Chandler, AZ (US)

( * ) Notice: Subject to any disclaimer, the term of this patent is extended or adjusted under 35 U.S.C. 154(b) by 760 days.

(21) Appl. No.: 13/329,625

(22) Filed: Dec. 19, 2011

(65) Prior Publication Data

US 2013/0157235 A1    Jun. 20, 2013

(51) Int. Cl.
    *G09B 13/00*    (2006.01)
    *G09B 13/04*    (2006.01)

(52) U.S. Cl.
    CPC ..................... *G09B 13/04* (2013.01)

(58) Field of Classification Search
    CPC ........................................ G09B 13/00
    USPC ......................................... 434/227
    See application file for complete search history.

(56) References Cited

U.S. PATENT DOCUMENTS

| | | | | |
|---|---|---|---|---|
| 3,690,231 A * | 9/1972 | Storch | ..................... | B41B 27/48 199/18 |
| 3,894,346 A * | 7/1975 | Ward et al. | ..................... | 434/228 |
| 3,898,748 A * | 8/1975 | Flanders | ..................... | 434/158 |
| 4,190,967 A * | 3/1980 | Ruegg et al. | ..................... | 434/227 |
| 4,253,248 A * | 3/1981 | Cornish | ..................... | G09B 17/003 434/178 |
| 4,378,217 A * | 3/1983 | Wilson et al. | ..................... | 434/228 |
| 4,690,645 A * | 9/1987 | Ukisu | ..................... | 434/309 |
| 4,891,786 A * | 1/1990 | Goldwasser | ..................... | 715/257 |
| 5,079,726 A * | 1/1992 | Keller | ..................... | 702/142 |
| 5,289,389 A * | 2/1994 | Keller | ..................... | 702/116 |
| 5,305,238 A * | 4/1994 | Starr et al. | ..................... | 702/176 |
| 5,352,050 A * | 10/1994 | Choate | ..................... | B41J 5/10 400/484 |
| 5,458,425 A * | 10/1995 | Torok | ..................... | B41J 5/10 400/486 |
| 5,718,590 A * | 2/1998 | Choate | ..................... | 434/227 |
| 6,120,297 A * | 9/2000 | Morse, III | ..................... | G09B 7/08 434/156 |
| 6,146,148 A * | 11/2000 | Stuppy | ..................... | G06Q 10/00 434/322 |
| 6,634,886 B2 * | 10/2003 | Oyama et al. | ..................... | 434/227 |
| 6,709,273 B2 * | 3/2004 | Stark et al. | ..................... | 434/227 |
| 2001/0014440 A1 * | 8/2001 | Oyama et al. | ..................... | 434/227 |
| 2002/0018983 A1 * | 2/2002 | Dixon | ..................... | 434/227 |
| 2003/0038735 A1 * | 2/2003 | Blumberg | ..................... | 341/22 |
| 2003/0165801 A1 * | 9/2003 | Levy | ..................... | 434/227 |
| 2003/0187723 A1 * | 10/2003 | Hadden | ..................... | G09B 7/00 705/7.42 |
| 2004/0166479 A1 * | 8/2004 | Wen et al. | ..................... | 434/156 |
| 2004/0168131 A1 * | 8/2004 | Blumberg | ..................... | 715/534 |

(Continued)

*Primary Examiner* — Sam Yao
*Assistant Examiner* — Alvin Carlos
(74) *Attorney, Agent, or Firm* — Etherton Law Group, LLC

(57) ABSTRACT

A method of training a student to type on a keyboard which has features that help the student avoid hunting and pecking. During training, a student is instructed to look at sample text and copy it by typing on a keyboard. The output of the student's keystrokes is displayed on a monitor. One feature sets a limited time period in which to type each keystroke. Another feature hides the display. The features may be used in combination.

5 Claims, 4 Drawing Sheets

(56) References Cited

U.S. PATENT DOCUMENTS

| | | | |
|---|---|---|---|
| 2006/0111448 A1* | 5/2006 | Epstein | A61K 31/137 |
| | | | 514/649 |
| 2006/0142083 A1* | 6/2006 | Kogo | G09B 13/02 |
| | | | 463/36 |
| 2006/0188856 A1* | 8/2006 | Kogo | G07F 17/32 |
| | | | 434/227 |
| 2006/0199156 A1* | 9/2006 | Kogo | 434/227 |
| 2009/0271192 A1* | 10/2009 | Marquette | G10L 15/26 |
| | | | 704/235 |
| 2010/0184009 A1* | 7/2010 | Rajkowski | G09B 7/00 |
| | | | 434/159 |

* cited by examiner

Fig. 3

METHOD OF KEYBOARD TRAINING USING KEYSTROKE TIME-OUT PERIOD

FIELD OF INVENTION

This invention relates generally to training a student how to use a keyboard. This invention relates particularly to a method of keyboard training that helps prevent or break the habit of hunting and pecking by employing a keystroke time-out period.

BACKGROUND

Keyboards are widely used to input data of all sorts into computers and other electronic devices. Alphanumeric keyboards, such as the QWERTY keyboard, or calculator keyboards, such as the 10-key, are common examples. Learning to type on these keyboards—called keyboarding—is important for using much of today's technology.

Best practices for keyboarding teach a default placement of the fingers over certain keys on the keyboard, known as the "home row" position. Eventually the keyboard student memorizes where each key is relative to this home row position. To learn keyboarding as an automatic skill, the same fingers need to depress the same keys each time. Keyboarding is most efficient when a student can depress keys with speed and accuracy while keeping his eyes on the sample text he is copying instead of the keys on the keyboard.

However, instead of learning where the keys are, a common problem is that a student just looks at the keyboard and uses any fingers to depress the keys. When copying from sample text, a student is tempted to look at the keyboard to find the letters, shift his eyes back to the sample text, read a few words, then look again at the keyboard to depress the keys. This method is known in the art as "hunting and pecking." Further, because the hands hover over the keyboard, the labels on the keys are difficult to see and the student may also pull his hands away from the home row position, sometimes tucking all but one or two fingers into a fist so that the keyboard is easier to see. The result is that the budding keyboarder may hunt and peck using only one or two fingers on each hand. The student is not learning where the keys are and cannot sustain much speed and accuracy because student is constantly stopping to find the next words on the copy and then depressing the keys with any finger.

Hunting and pecking slows the rate of data entry because the keyboarder spends time searching and moving fingers to letters inconsistently, and is constantly shifting his gaze from the text or copy to the keyboard thereby creating a lot of pauses. The keyboarder spends time searching and moving hands to a letter instead of depressing keys located directly under, or nearly directly under, hands positioned in the home row position, and because the keyboarder is constantly shifting his gaze from the sample text to the keyboard. It is desirable to avoid hunting and pecking, and it is therefore desirable to implement training methods that help the student avoid hunting and pecking. It is desirable to implement training methods that help the student keep eyes on the sample text, learn each key in relation to the home row position, and consistently depress each key with the correct finger, which results in learning an automatic response in keyboarding without unnecessary pauses.

SUMMARY OF THE INVENTION

This is a method of training a student to type on a keyboard with accuracy and speed, particularly by helping the student to not hunt and peck. It trains a student to keep his eyes on the copy and prevents unnecessary pauses due to looking away from the text. During a training session, a student is instructed to look at sample text, which may include letters, numbers, punctuation, symbols or a combination thereof. At the end of a test period, the number of words typed and the error count may be displayed on a monitor.

The student copies the sample text by typing keystrokes on a keyboard which correlate to the characters in the text. A time period is set in which each subsequent keystroke must be typed after the previous keystroke. If a keystroke is not typed within the keystroke period, the test period stops and no score is displayed.

To further discourage hunting and pecking, the display may be hidden so a student cannot see what he is typing while he is typing. The time-limited keystroke and the hidden display features may be used in combination.

BRIEF DESCRIPTION OF THE DRAWINGS

FIG. 3 is an illustration of a screen shot showing where blackout feature is set.

DETAILED DESCRIPTION OF THE INVENTION

Figure 1:
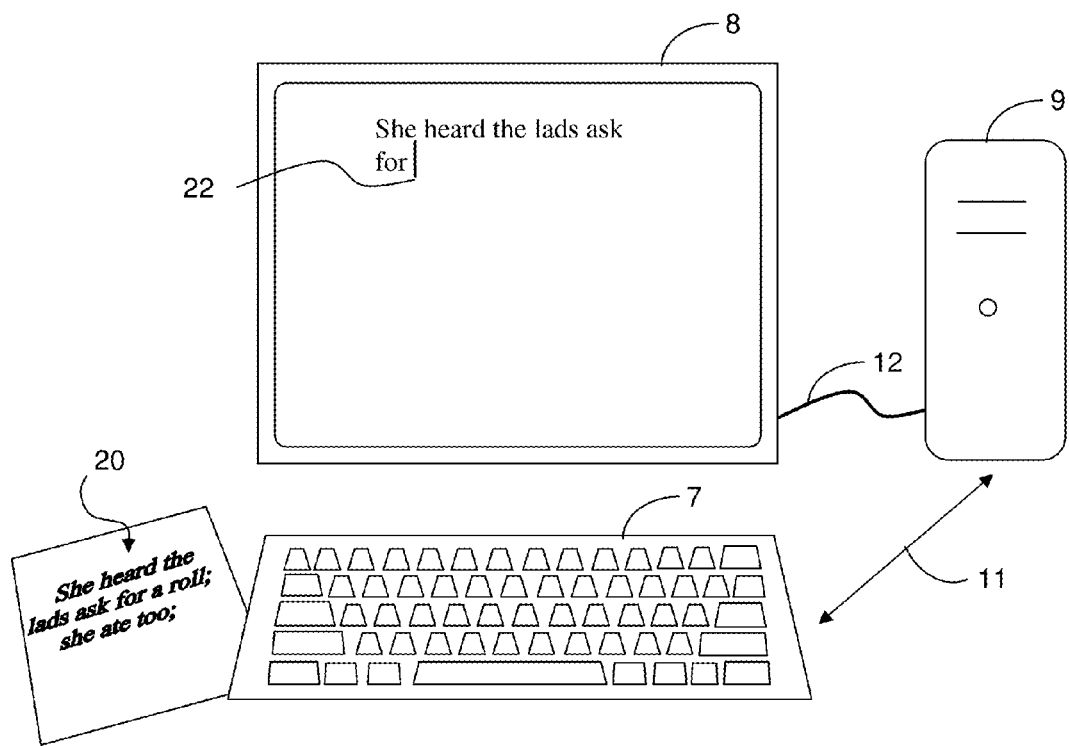
FIG. 1 is a front view of a keyboard in communication with a monitor displaying the keystrokes of a test period in progress.

For a keyboard training session, a keyboard 7 is in electronic communication with a monitor 8. The keyboard 7 is also in communication with a computer 9. The keyboard 7 may be integral with the monitor 8 and computer 9, attached by wire or attached wirelessly. In the preferred embodiment, a keyboard 7 is in wireless communication 11 with a computer 9, which is connected by wire 12 to a monitor 8. See FIG. 1. The computer 9 may be a stand-alone computer, networked, or in communication with the internet. In the preferred embodiment, the computer 9 communicates with the internet and can access keyboard training software online, which is available commercially from a number of vendors. Alternatively, the keyboard training software can be accessed on removable media placed in the computer 9, also available commercially.

During a keyboard training session, a student is instructed to type as many words, as accurately and quickly as possible, during a given time period. This time period is referred to herein as a test period, although it is also known in the art as a "timing" or "practice timing." Test periods can be of any length, but are commonly between 15 seconds and 5 minutes. The student is instructed to look at sample text 20, which may include letters, numbers, punctuation, symbols or a combination thereof, referred to herein as characters. Subsets of the characters make up words. For example, a sample text could read "She heard the lads ask for a roll; she ate too." See FIG. 1. The student copies the sample text 20 by typing keystrokes on a keyboard 7 which correlate to the letters and punctuation. The student tries to type the sample text 20 as many times as possible in the given test period. The number of words typed within a given test period is counted. For this sample text, a space counts as a character, and every five characters equals one word. There are 47 characters in this sample text, which equals 9.4 words (47÷5=9.4). The higher the word count the better. At the end of a test period, the total score in words-per-minute can be calculated. In a 15-second test period, for example, 9.4 words typed would be multiplied by 4 to obtain the words-per-minute (wpm) score. Errors may be noted and reported with the wpm score.

To help the student avoid hunting and pecking, a time period is set in which each subsequent keystroke must be typed after the previous keystroke, referred to herein as the keystroke period. If a keystroke is not typed within the keystroke period, the word count in a given test period is reset to zero. The timeout period applies even if a student pauses at the end of the sentence to rest before beginning the sentence again. In such case if the rest took longer than designated keystroke period, the word count in a given test period is reset to zero. The keystroke period encourages students to type continuously without pauses until the test period runs out.

For example, assume the test period has been set to 15 seconds, the keystroke period has been set to 3 seconds and the student has been given the sample text 20 shown in FIG. 1. As soon as the test period starts, the student starts copying the sample text 20 by typing corresponding keystrokes. Assume the student types the keystrokes for the characters S-h-e-_-h-e-a-r-d-_-t-h-e-_-l-a-d-s-_-a-s-k-_-f-o-r in the test period, with each letter typed within 3 seconds of the previous keystroke. The word count at the end of the test period would equal 5.2 (26 characters÷5 characters per word=5.2 words. This is equivalent to 20.8 words per minute. (5.2 words×15 seconds/60 (seconds/minute)=20.8 WPM). Assume instead, however, the student types S-h-e-_-h-e-a-r-d with each letter typed within 3 seconds of the previous keystroke, but then can't remember where the "t" is on the keyboard 7 and takes more than 3 seconds to type it. The word count would be reset to zero. Preferably the test period timer is also reset to zero, and the student would not receive a score because the entire test is reset. Alternatively, if there is still time remaining in the test period, the student can start typing the sample text 20 again. For example, if the student types S-h-e-_-h-e-a-r-d again, with each letter typed within 3 seconds of the previous keystroke, and then the test period runs out, the word count would be 1.8. This is equivalent to 7.2 words per minute (1.8 words× 15 seconds/60 (seconds/minutes)=7.2 WPM). This encourages the student to continue typing until the test period runs out.

The keystroke period eliminates hunting and pecking because the students does not have enough time to look down at the keyboard 7 to find the keys to get a higher word count. Not allowing pauses when entering keystrokes encourages the student to develop good rhythm technique as he is typing. Not having pauses during a test period is the best practice for obtaining higher words per minute with fewer errors.

Figure 2:
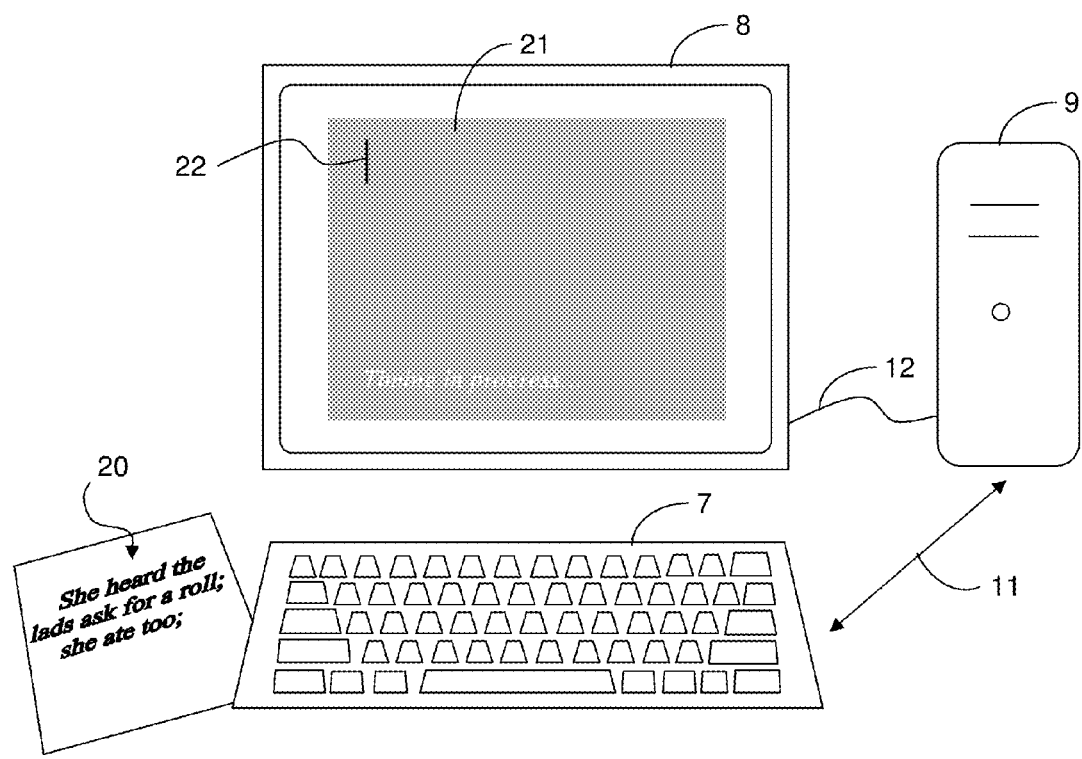
FIG. 2 is a front view of a keyboard in communication with a monitor in which the keystrokes of a test period in progress are hidden.

Another common problem for a person learning to type is that, in addition to being tempted to look at the keyboard 7 to find the letters and shift his eyes back and forth from the sample text 20, the student may also look away from the sample text 20 to the monitor 8 to see what letters are being displayed. If a student looks down at the keys to hunt and peck, he can't see what he has typed and has a harder time trying to determine where he left off so he has to read more text to hunt and peck. This extra time needed to find out where he left off in the sample text and resume typing most often results in pauses that exceed the keystroke period. To prevent the resulting delay, the display can be hidden so that the student is not tempted to look at what he has typed. See FIG. 2. One way to hide the display of keystrokes is to display a blank screen, essentially disallowing the keystrokes from being displayed on the screen. Alternatively, the keystroke output can be made the same color as the background displayed on the screen, such that the keystrokes are camouflaged by the being the same color. In yet another alternative, the monitor 8 can be instructed to display a single block 21 of color or image that covers the screen where the keystroke output would be displayed. FIG. 2 shows a monitor 8 displaying a single block of grey color where the keystroke output would be displayed. The cursor 22 may be allowed to be displayed to indicate the keystroke progress across the monitor 8.

Figure 3:
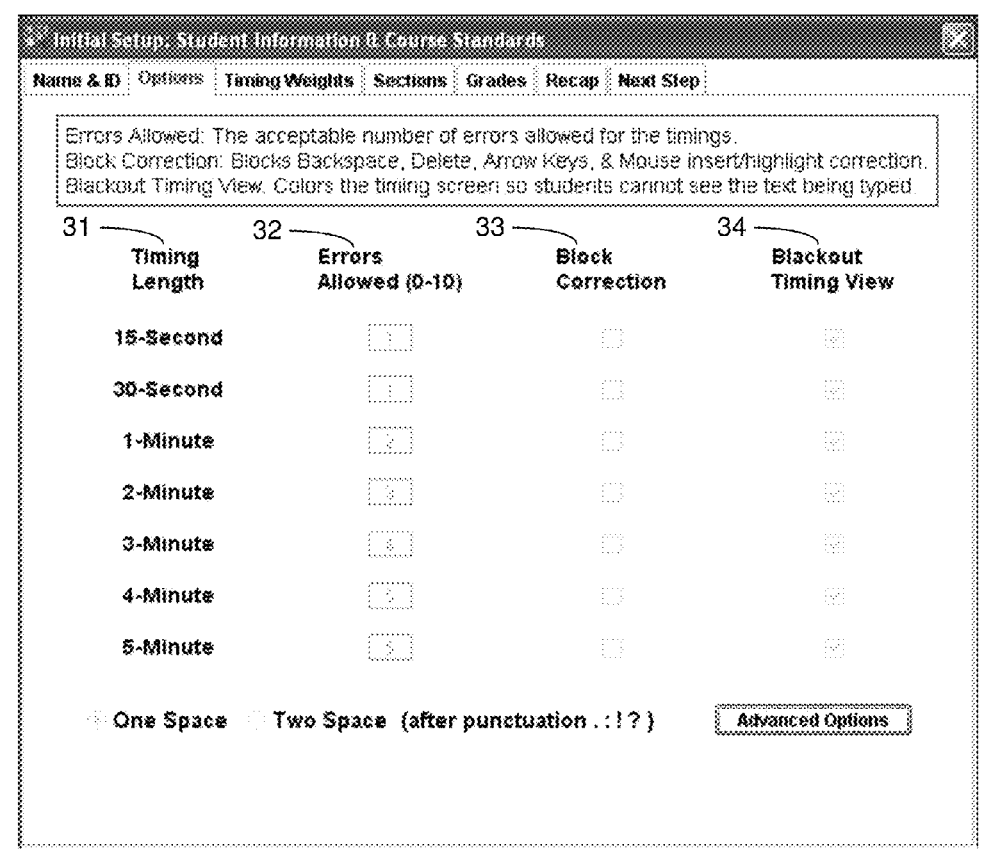
Figure 4:
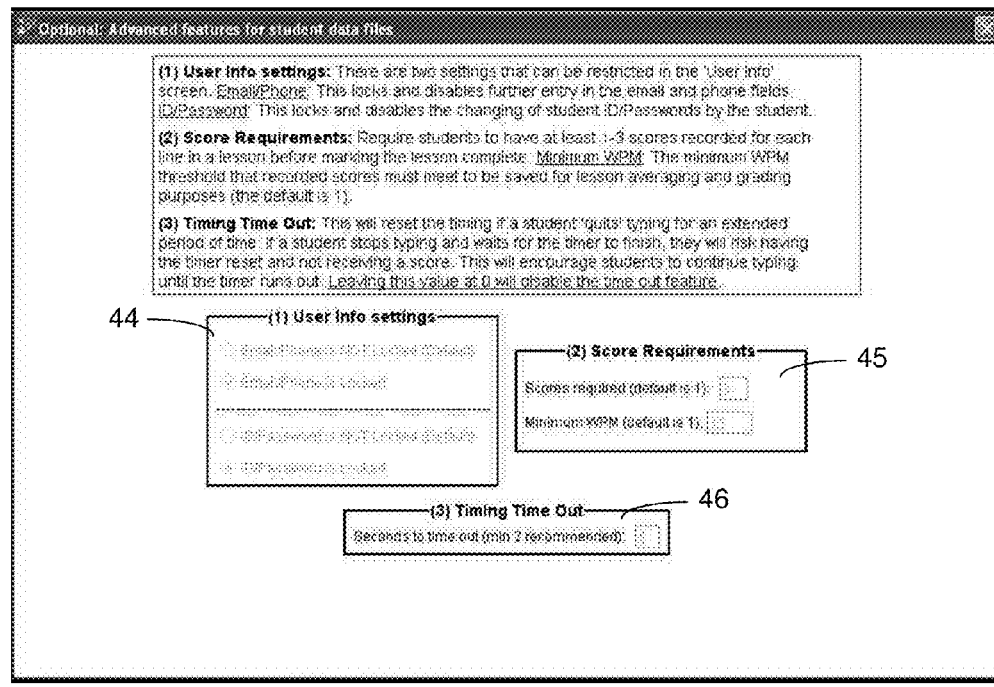
FIG. 4 is an illustration of a screen shot showing where the keystroke period is set.

In one example, the keyboard training software is accessed on the internet from Ellsworth Publishing at www.keyboardingonline.com. The software enables the teacher to, among other things, set the keystroke period, time period and display blackout for each student. See FIGS. 3 and 4. FIG. 3 shows a screenshot of a page in the software that enables the teacher to set, for each test period length (the "timing length") 31, the number of errors allowed per test period (the "errors allowed") 32, the student's ability to correct errors during a test period ("block correction") 33, and whether the keystrokes are displayed during the test period ("blackout timing view") 34. These options are customizable for each student and would apply to each test period the student tried. FIG. 4 shows a screenshot of a page in the software that enables the teacher to set whether the student can change his email or password ("(1) User info settings") 44, how many test periods must be completed for a given lesson ("(2) Score Requirements") 45, and the keystroke period ("(3) Timing Time Out") 46. As with the features shown in FIG. 3, these options are customizable for each student and would apply to each test period the student tried.

A QWERTY keyboard has been used herein to illustrate how the method works. However, other types of keyboards can be used with the present invention, such as a 10-key, a musical keyboard, smart phone keyboard, stenography keyboard, and others.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

What is claimed is:

1. A method for training a student in the use of a keyboard comprising:
    a) providing the keyboard on which the student can type a plurality of keystrokes;
    b) instructing the student to look at a set of instructed keystrokes and to type as many keystrokes to match the instructed keystrokes as possible during a set period of time;
    c) receiving, at a computer that is in communication with the keyboard and with a monitor, input as the student types the keystrokes;
    d) analyzing the input with the computer;

e) preventing the keystroke input from displaying as keystroke output on the monitor, whether or not the keystroke input accurately matches the instructed keystrokes;
f) counting the keystrokes and calculating a word count;
g) calculating a word-per-minute score from the word count and set period of time; and
h) displaying on the monitor the word-per-minute score wherein:
i) the monitor has a background color; and ii) all keystroke output is prevented from being displayed by making the keystroke output the same color as the background color displayed on the monitor.

2. A method for training a student in the use of a keyboard, the method comprising:
a) providing the keyboard on which the student can type a plurality of keystrokes;
b) instructing the student to copy sample text by typing keystrokes on the keyboard, wherein each keystroke subsequent to a previous keystroke correlates to a subsequent letter or number in the sample text;
c) setting a keystroke period within which each subsequent keystroke must be typed after the previous keystroke;
d) receiving, at a computer that is in communication with the keyboard and with a monitor, input as the student types the keystrokes; and
e) preventing the keystroke input from displaying as keystroke output on the monitor, whether or not the keystroke input accurately matches the instructed keystrokes;
f) counting the keystrokes and calculating a word count; and
g) displaying on the monitor the word count, wherein the keystroke output is prevented from being displayed by displaying an image over the keystroke output.

3. A method for training a student in the use of a keyboard, the method comprising:
a) providing the keyboard on which the student can type a plurality of keystrokes;
b) instructing the student to copy sample text by typing keystrokes on the keyboard, wherein each keystroke subsequent to a previous keystroke correlates to a subsequent letter or number in the sample text;
c) setting a keystroke period within which each subsequent keystroke must be typed after the previous keystroke;
d) receiving, at a computer that is in communication with the keyboard and with a monitor, input as the student types the keystrokes; and
e) preventing the keystroke input from displaying as keystroke output on the monitor, whether or not the keystroke input accurately matches the instructed keystrokes;
f) counting the keystrokes and calculating a word count; and
g) displaying on the monitor the word count, wherein the monitor has a background color and the keystroke output is prevented from being displayed by making the keystroke output the same color as the background color displayed on the monitor.

4. A method for training a student in the use of a keyboard, the method comprising:
a) providing the keyboard on which the student can type a plurality of keystrokes;
b) setting a test period of a given length, the test period having a beginning and an end;
c) instructing the student to look at sample text wherein the text comprises a plurality of letters, numbers or both, and subsets of the letters and numbers comprise words;
d) instructing the student to copy the sample text by typing a plurality of keystrokes on a keyboard, wherein each keystroke subsequent to a previous keystroke correlates to a subsequent letter or number in the sample text;
e) preventing the keystroke input from displaying as keystroke output on the monitor, whether or not the keystroke input accurately matches the instructed keystrokes;
f) counting the number of words typed in the test period;
g) setting a keystroke period in which each subsequent keystroke must be typed after the previous keystroke;
h) if the subsequent keystroke is not typed within the keystroke period, resetting the word count to zero, and resetting the test period back to the beginning wherein the keystroke output is prevented from being displayed by displaying an image over the keystroke output.

5. A method for training a student in the use of a keyboard, the method comprising:
a) providing the keyboard on which the student can type a plurality of keystrokes;
b) setting a test period of a given length, the test period having a beginning and an end;
c) instructing the student to look at sample text wherein the text comprises a plurality of letters, numbers or both, and subsets of the letters and numbers comprise words;
d) instructing the student to copy the sample text by typing a plurality of keystrokes on a keyboard, wherein each keystroke subsequent to a previous keystroke correlates to a subsequent letter or number in the sample text;
e) preventing the keystroke input from displaying as keystroke output on the monitor, whether or not the keystroke input accurately matches the instructed keystrokes;
f) counting the number of words typed in the test period;
g) setting a keystroke period in which each subsequent keystroke must be typed after the previous keystroke;
h) if the subsequent keystroke is not typed within the keystroke period, resetting the word count to zero, and resetting the test period back to the beginning wherein the keystroke output is prevented from being displayed by making the keystroke output the same color as the background displayed on the monitor.

* * * * *